United States Patent [19]

King, Jr.

[11] Patent Number: 5,850,398
[45] Date of Patent: Dec. 15, 1998

[54] METHOD OF SCHEDULING DATA CELL TRANSMISSION IN AN ATM NETWORK

[75] Inventor: Merrill K. King, Jr., Sterling, Va.

[73] Assignee: Hyundai Electronics America, San Jose, Calif.

[21] Appl. No.: 774,508

[22] Filed: Dec. 30, 1996

[51] Int. Cl.[6] ................................................. H04J 3/22
[52] U.S. Cl. ....................... 370/412; 370/230; 370/395
[58] Field of Search ................................. 370/230, 412, 370/415, 229, 232, 233, 234, 395, 428, 429

[56] References Cited

U.S. PATENT DOCUMENTS

| | | | |
|---|---|---|---|
| 4,947,388 | 8/1990 | Kuwahara et al. | 370/60 |
| 5,065,396 | 11/1991 | Castellano et al. | 370/84 |
| 5,079,762 | 1/1992 | Tanabe | 370/60 |
| 5,130,975 | 7/1992 | Akata | 370/60 |
| 5,317,561 | 5/1994 | Fischer et al. | 370/16 |
| 5,357,506 | 10/1994 | Suguwara | 370/60 |
| 5,463,620 | 10/1995 | Sriram | 370/412 |
| 5,533,009 | 7/1996 | Chen | 370/232 |
| 5,533,020 | 7/1996 | Byrn et al. | 370/395 |
| 5,619,502 | 4/1997 | Kahn et al. | 370/397 |
| 5,629,937 | 5/1997 | Hayer et al. | 370/233 |

OTHER PUBLICATIONS

K. Eng, M. Karol, and Y-S Yeh, "Growable Packet (ATM) Switch Architecture: Design Principles and Applications," IEEE Trans Comm., pp. 423–430, Feb. 1992.

Atwater and F. Schoute, "Optical Queueing Policies for Fast Packet Switching of Mixed Traffic," IEEE JSAC, pp. 458–467, Apr. 1991.

Primary Examiner—Chi H. Pham
Assistant Examiner—W. Todd Baker
Attorney, Agent, or Firm—Townsend and Townsend and Crew LLP; Henry K. Woodward

[57] ABSTRACT

A transmit scheduler maps connections to scheduled time slots in an ATM network in such a manner that minimizes burstiness in an output cell stream. The smoothness in the resulting cell streams reduces the probability of loss in the network and also assures that a connection does not exceed a preestablished bandwidth. The invention can be utilized with service with a constant bit rate (CBR), a variable bit rate (VBR) and an available bit rate (ABR) traffic. Bandwidth factors are established for cells to be transmitted as a percentage of total bandwidth of the ATM network. Lists are maintained for cells to be transmitted with each list assigned a bandwidth factor. The total bandwidth in the ATM network is apportioned into time slots according to established bandwidth factors and with different bandwidths being multiplexed across the total bandwidth. Cells are selected for transmission from the list of cells in accordance with available time slots and the bandwidth factors thereof.

4 Claims, 1 Drawing Sheet

Functional Block diagram of a Network Interface CARD (NIC).

Functional Block diagram of a Network Interface CARD (NIC).

METHOD OF SCHEDULING DATA CELL TRANSMISSION IN AN ATM NETWORK

CROSS-REFERENCE TO RELATED APPLICATIONS

This application is related to the following copending applications:

Ser. No. 08/774,536 filed on Dec. 30, 1996, "Distributed Buffering System for ATM Switches"; and Ser. No. 08/777,438, filed on Dec. 30, 1996, "ATM Queuing System"; and Ser. No. 08/778,203 filed on Dec. 30, 1996, "Line Interface Unit for Adapting Broad Bandwidth Network to Lower Bandwidth Network Fabric".

BACKGROUND OF THE INVENTION

This invention relates generally to communications technology, and more particularly, the invention relates to the scheduling of transmission of data cells in an asynchronous transfer mode (ATM) network fabric when the cells have different bandwidth factors in using the ATM network fabric.

The communications industry is rapidly expanding in network technologies for the broad band transmission of voice, video and data. Two such technologies are SONET, which is a high speed synchronous carrier system based on the use of optical fiber technology, and ATM which is a high speed low delay multiplexing and switching network. SONET is high speed, high capacity and suitable for large public networks, whereas ATM is applicable to a broad band integrated services digital network (BISDN) for providing convergence, multiplexing, and switching operations.

The present invention is directed to the scheduling of cell transmission in an ATM network when cells have established bandwidths in number of cells per second transmitted. The scheduling also fairly distributes available bandwidth between multiple connections so that each connection receives at least a fair amount of bandwidth without exceeding a negotiated bandwidth.

SUMMARY OF THE INVENTION

In accordance with the invention, a transmit scheduler maps connections to scheduled time slots in an ATM network in such a manner that minimizes burstiness in an output cell stream. The smoothness in the resulting cell streams reduces the probability of loss in the network and also assures that a connection does not exceed a preestablished bandwidth. The invention can be utilized with services supporting constant bit rate (CBR), variable bit rate (VBR) and available bit rate (ABR) traffic.

More particularly, bandwidth factors are established for cells to be transmitted as a percentage of total bandwidth of the ATM network. Lists are maintained for cells to be transmitted with each list assigned a bandwidth factor. The total bandwidth in the ATM network is apportioned into time slots according to established bandwidth factors and with different bandwidths being multiplexed across the total bandwidth. Cells are selected for transmission from the list of cells in accordance with available time slots and the bandwidth factors thereof.

An available time slot is assigned to cells with the largest bandwidth within the bandwidth of the time slot. A plurality of cells can be assigned to an available time slot when the sum of the bandwidths of the plurality of cells is within the bandwidth of the time slot.

In accordance with a preferred embodiment, an active set of lists is maintained for use in assigning time slots and, an update set of lists is used for replacing transmitted cells with new cells awaiting transmission. The active set of lists and the update set of lists are periodically alternated.

The invention and objects and features thereof will be more readily apparent form the following detailed description and appended claims when taken with the drawings.

DETAILED DESCRIPTION OF THE PREFERRED EMBODIMENT

Figure 1:
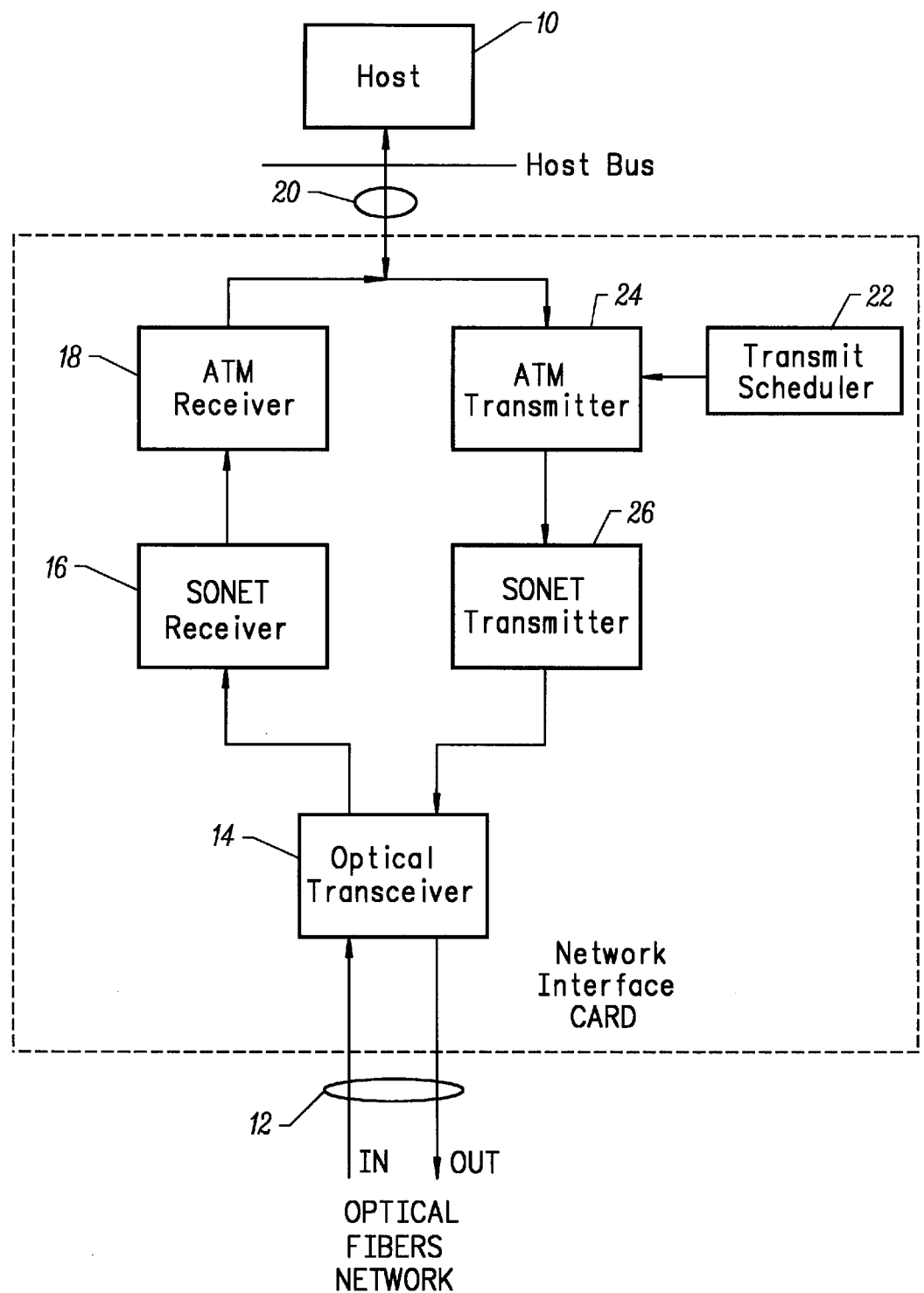
FIG. 1 is a functional block diagram of an ATM network interface card (NIC) including a Transmit Scheduler in accordance with the invention.

The transmit scheduler is a component of an ATM network interface card (NIC), as illustrated in the functional block diagram of an NIC shown in FIG. 1. There are two paths of data flow through the NIC. In the first, SONET frames carrying ATM cells are transmitted by the network to the host 10 through optical fibers 12. Here, the optical transceiver 14 converts the optical signal into an electrical signal, which the optical transceiver then transfers to the SONET receiver 16. The SONET receiver function synchronizes to the SONET frames in the electrical signal, extracts the transported data, and transfers the extracted data as a stream to the ATM receiver function 18. The ATM receiver function detects cells in the extracted data stream, reassembles thee cells into data packets, and then transfers the packets to the host over the host bus 20.

The second path of data flow through the NIC is from the host to the network. Here, the transmit scheduler 22 indicates to the ATM transmitter function 24 when it is to transmit a cell from the host to the network. The transmit scheduler indicates to the ATM transmitter function which connection the next cell payload data should come from via a connection identifier. The ATM transmitter reads in one cell payload of data, 48 bytes, for the indicated connection from the host (over the host bus), and transmits that data to the SONET transmitter 26. The SONET transmitter takes the cells presented to it, places these cells within SONET frames, and then transmits the frames to the optical transceiver 4. The optical transceiver then transmits the SONET signal, incorporating the ATM cells, onto the optical fiber 12 into the ATM network.

The transmit scheduler is necessary as there are multiple connections from a host into the network, each of which may have different bandwidth assignments. Furthermore, it is necessary that the data for each connection be transmitted with as uniform time-spacing between consecutive cells from as many connections as possible to forestall data losses due to excessive burstiness in the transmitted data. Thus, the function of the transmit scheduler is to produce requests for cell transmissions for multiple connections that are carried over the SONET link into the network.

In accordance with the invention, a transmit scheduler maps connections to scheduled time slots in an ATM network in such a manner that minimizes burstiness in the output cell stream. The smoothness in the resulting cell streams reduces the probability of loss in the network and also assures that a connection does not exceed the associated traffic contract.

The scheduler can be controlled by external software to allow for service of available bit rate traffic (ABR), an emerging standard in the ATM Forum, as well as the currently defined constant bit rate (CBR) and variable bit rate (VBR) services.

More particularly, the Transmit Scheduler generates a schedule of transmit data cells referenced by connection identifier and presents the connection identifiers (CONNIDs) of outgoing cells in a Transmit DMA logic, which handles the actual data transfer.

The Transmit Scheduler logic maintains two schedules in local on-board RAM (a 32K×16 SRAM designated TSRAM)—an update schedule and an active schedule. Each schedule consists of 1024 entries and each entry is either a connection identifier or a null identifier. A connection identifier denotes that a single cell of 48 data bytes from that particular connection is to be retrieved from host memory by the Transmit DMA logic. A null identifier indicates that no transfer is scheduled to take place at that time.

The update schedule is used to make schedule modifications while the active schedule is the schedule used to supply the Transmit DMA logic with connection identifiers. In this way, the transmit scheduler logic can modify the update schedule without affecting the balanced connection identifier distribution of the active schedule. When the end of the active schedule is reached, the two schedules are eligible to be swapped, if the update schedule is not currently processing a scheduling request.

The active schedule slots are sequentially queried upon request from the Transmit DMA logic (currently every cell period or 682/2728 ns bat 622/155 Mbits per second, assuming a 53-byte cell). The contents of the active schedule slot are passed on to the Transmit DMA logic.

If the retrieved active schedule slot data is a null identifier, it is ignored by the Transmit DMA logic. If the retrieved active schedule slot data is a connection identifier, the Transmit DMA logic will attempt to transfer a cell of data for that connection from host memory to the onboard Transmit FIFOS. If the Transmit DMA logic is busy with another data transfer at the time that a new transfer request arrives, there are two possible courses of action. The first option is to drop the incoming connection identifier. No data is lost by doing this, but the Transmit DMA logic will be unable to attempt to transmit a cell of data for that particular connection until the next time its connection identifier appears in the active schedule. The second option is to buffer up incoming connection identifiers by ceasing to query the active schedule slots until such time as the Transmit DMA logic resources become available.

The scheduling logic itself is responsible for accepting transmit connection allocations and deallocations from the host device driver via the Slave Interface logic and manipulating the update schedule as necessary to minimize burstiness for any given connection. The basic information that the host passes on to the scheduling logic consists of a 10-bit connection identifier (CONNID), a 5-bit bandwidth factor (BWF), and an allocation/deallocation indicator. There are only ten allowable bandwidth factors, and they correspond to $1/2^n$ (where n=1–10) expressed as a percentage of the total available transmit bandwidth. This corresponds to $1024/2^n$ entries in the actual; schedule list of connection identifiers, as shown below:

| n | % bandwidth | entries in schedule | entries in BWF list |
|---|---|---|---|
| 1 | 50% | 512 | 2 |
| 2 | 25% | 256 | 4 |
| 3 | 12.5% | 128 | 8 |
| ... | ... | ... | ... |
| 10 | 0.098% | 1 | 1024 |

The scheduler logic maintains ten lists in local on-board RAM, each corresponding to a specific BWF. When a transmit connection allocation request is generated, the scheduler logic scans through all ten lists starting with the n=1 list (50%) (2 entries) and ending with the n=10 list (0.098%)(1024 entries). The CONNID for the new connection is placed in the first available empty space in the appropriate list. An empty space is denoted with a null indicator. When a transmit connection deallocation request is generated, the scheduler logic scans through the lists as above, replacing the proper CONNID value in the appropriate matching list with a null indicator.

It is important to note that the scheduler logic scans through every entry in all ten lists, which amounts to 2047 entries (2+4+8+. . . +256+512+1024), although at most only 1024 entries will contain a CONNID. As transmit connections are allocated or deallocated, the scheduler logic updates the working schedule as described in the following paragraphs.

When it finds a CONNID in the lists, the scheduler logic sequentially increments a variable-size counter through a number of counts equal to the number of entries in the schedule (see table above) specific to that list where the CONNID was found to reside. For example, a CONNID found in the 12.5% list will fill 128 entries in the schedule and the counter will increment from 0 through 127. At the same time a 10-bit Schedule address Offset counter is also allowed to increment from its current value through the same number of counts as the variable-size counter. The Schedule Address Offset is used as a pointer into the update schedule. The connection identifier being scheduled is written into the update schedule at the address determined by the bit-reversal of the update schedule pointer. In this way, the working schedule can be updated as transmit connections are allocated and deallocated. When the final entry of the last list is scanned and accounted for, the Schedule Address Offset counter is incremented if necessary to completely cycle through all the remaining schedule addresses, filling them with null identifiers.

In order to distribute the cells for a particular transmit connection as evenly as possible within the 1024-entry working schedule, the 10-bit counter schedule address outputs are bit-reversed when addressing the working schedule.

An even distribution of cells also depends on traversing the bandwidth lists from large to small bandwidths. This is because larger bandwidth connections must be aligned on more stringent schedule address boundaries than smaller bandwidth connections. Specifically, for a given value of n, the (10−n) least significant bits of the starting address of the 10-bit schedule address counter must be zero. For example, to evenly spread out the cells for an n=1 (50%) connection, the starting address of the 10-bit counter must be X000000000, which will also be the starting address of the next connection since n=1 implies cycling through 512 (binary 1000000000) counts of the schedule address counter, while an n=10 (0.098%) connection can be aligned anywhere. It follows then that a connection with a certain value of n can be aligned on the schedule address boundaries of any connections with values of n less than or equal to its own value. Therefore, traversing the bandwidth lists from large bandwidth to small bandwidth ensures that all starting address boundary alignment requirements are met, thus minimizing transmit connection bursts within the given schedule. Note, however, that some extra burstiness may occur when the active and working schedules are swapped.

A connection can be allocated multiple times with different BWFs such that an agreeable aggregate bandwidth value is achieved. In such a case, however, there is no way to minimize any burstiness generated as a result of the multiple independent allocations. Burstiness is minimized only within each allocation with respect to cells schedule within that allocation. When deallocating a connection made up of multiple independent allocations, each independent bandwidth allocation must be separately deallocated.

There has been described an improved method of scheduling the transmission of data cells in an ATM network when the cells have different bandwidth factors in use of the ATM network. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method of scheduling transmission of data cells in an ATM network comprising the steps of:

a) establishing bandwidth factors for cells to be transmitted as a percentage of total bandwidth in the ATM network;

b) maintaining lists of cells to be transmitted with each list assigned a bandwidth factor, including maintaining an active set of lists for use in assigning time slots and an update set of lists for replacing transmitted cells with new cells awaiting transmission, said active set of lists and said update set of lists being periodically alternated, c) apportioning the total bandwidth in the ATM network into slots according to established bandwidth factors and with different bandwidths being multiplexed across the total bandwidth, and d) selecting cells for transmission from said lists of cells in accordance with available slots and bandwidth factors thereof.

2. The method as defined by claim 1, wherein step d) includes scanning said lists of cells from larger bandwidths to smaller bandwidths in selecting cells for transmission.

3. The method as defined by claim 1, wherein an available time slot in the total bandwidth is assigned to the largest bandwidth cells within the bandwidth of the slot.

4. The method as defined by claim 1, wherein a plurality of cells are assigned to an available slot when the sum of the bandwidths of the plurality of cells is within the bandwidth of the slot.

* * * * *